United States Patent
Baughman et al.

(10) Patent No.: US 10,623,416 B2
(45) Date of Patent: Apr. 14, 2020

(54) TORRENT ATTACK DETECTION

(71) Applicant: International Business Machines Corporation, Armonk, NY (US)

(72) Inventors: Aaron K. Baughman, Silver Spring, MD (US); Mauro Marzorati, Lutz, FL (US); Gary F. Diamanti, Wake Forest, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 15/884,910

(22) Filed: Jan. 31, 2018

(65) Prior Publication Data
US 2020/0076831 A1 Mar. 5, 2020

(51) Int. Cl.
*H04L 29/06* (2006.01)

(52) U.S. Cl.
CPC .............. *H04L 63/14* (2013.01); *H04L 63/20* (2013.01)

(58) Field of Classification Search
CPC . H04L 63/1433; H04L 63/20; H04L 63/1416; H04L 63/1441; H04L 63/1425; H04L 63/145; H04L 63/1408; G06F 21/552; G06F 21/554; G06F 16/2365; G06F 21/577; G06F 21/6245
See application file for complete search history.

(56) References Cited

U.S. PATENT DOCUMENTS

| | | | |
|---|---|---|---|
| 5,922,963 A | 7/1999 | Piety et al. | |
| 8,358,815 B2 | 1/2013 | Benkley et al. | |
| 8,805,110 B2 | 8/2014 | Rhoads et al. | |
| 9,405,900 B2 | 8/2016 | Dixit et al. | |
| 2004/0249520 A1 | 12/2004 | Maine | |
| 2006/0212755 A1 | 9/2006 | Urmanov et al. | |
| 2010/0060604 A1 | 3/2010 | Zwart et al. | |
| 2012/0131674 A1* | 5/2012 | Wittenschlaeger | G06F 21/552 |
| | | | 726/23 |
| 2012/0304007 A1 | 11/2012 | Hanks et al. | |
| 2015/0346706 A1 | 12/2015 | Gendelman | |
| 2016/0087933 A1 | 3/2016 | Johnson et al. | |
| 2017/0213025 A1* | 7/2017 | Srivastav | G06F 21/552 |
| 2018/0004948 A1* | 1/2018 | Martin | H04L 63/1425 |

OTHER PUBLICATIONS

Almalawi, et al., "An Efficient Data-Driven Clustering Technique to Detect Attacks in SCADA Systems," IEEE Transactions on Information Forensics and Security, vol. 11, No. 5, May 2016, pp. 893-906.

(Continued)

*Primary Examiner* — Trang T Doan
(74) *Attorney, Agent, or Firm* — Stosch Sabo

(57) ABSTRACT

A cybersecurity system generates feature signatures for respective devices of a plurality of communicatively coupled devices. The cybersecurity system predicts future feature signatures for respective devices. The cybersecurity system determines a first probability of a first future feature signature occurring for a first device. The cybersecurity system determines a second probability of the first future feature signature occurring and accounting for performance decay of the first device. The cybersecurity system mitigates an identified cyberattack based on the first probability and the second probability.

20 Claims, 9 Drawing Sheets

(56) References Cited

OTHER PUBLICATIONS

Illiano, et al., "Detecting Malicious Data Injections in Wireless Sensor Networks: A Survey," ACM Computing Surveys, vol. 48, No. 2, Article 24, Pub. Date: Oct. 2015, 33 pages.

Mell et al., "The NIST Definition of Cloud Computing", National Institute of Standards and Technology, Special Publication 800-145, Sep. 2011, 7 pages.

Nelson, "New sound monitoring by IoT can predict mechanical failure." Network World, Jul. 10, 2015, 4 pg, <https://www.networkworld.com/article/2946195/internet-of-things/new-sound-monitoring-by-iot-can-predict-mechanical-failure.html>.

Oh, et al., "A Malicious Pattern Detection Engine for Embedded Security Systems in the Internet of Things." Sensors 2014, 14, doi:10.3390/s141224188, pp. 24188-24211, <www.mdpi.com/journal/sensors>.

Plante, et al., "Faults Detection and Failures Prediction Using Vibration Analysis," IEEE Autotestcon, Nov. 2-5, 2015, Copyright 2015 IEEE, 5 pages.

Pradhan, et al., "Fault detection in a centrifugal pump using vibration and motor current signature analysis." International Journal of Automation and Control. vol. 6, Nos. 3/4, 2012, 17 pages.

Sabin, Steven., "Cybersecurity Considerations for Vibration Monitoring Systems," Setpoint, Whitepaper, Rev E (Jun. 2016), pp. 1-26.

Siemens, et al., "A System for the Detection and Proactive Response to Corruption of Intelligent Electronic Devices", IP.com No. IPCOM000211791D, IP.com Electronic Publication Date: Oct. 19, 2011, 6 pages.

Tan, et al., "Vibration Signal Processing for Machine Failure Detection," International Symposium on Signal Processing and Its Applications, ISSPA, Gold Coast, Australia, 25-3.

\* cited by examiner

TORRENT ATTACK DETECTION

BACKGROUND

The present disclosure relates to detecting malicious attacks, and, more specifically, to detecting malicious attacks in the Internet of Things (IoT).

SUMMARY

Aspects of the present disclosure are directed toward a computer-implemented method comprising collecting, by a cybersecurity system, respective data from respective devices of a plurality of devices communicatively coupled to one another. The respective data comprises at least one type of data selected from the group consisting of mechanical data and electrical data. The method can further comprise generating, by the cybersecurity system and based on the respective data, at least a first feature signature for a first device. The method can further comprise predicting, by the cybersecurity system and based on the first feature signature, a first future feature signature for the first device. The method can further comprise determining, by the cybersecurity system, a first probability that the first future feature signature will occur. The first probability can be based on historical data of the first device. The method can further comprise determining, by the cybersecurity system, a second probability that the first future feature signature will occur. The second probability can be based on historical data of the first device and performance decay data of the first device. The method can further comprise providing, by the cybersecurity system and to a user interface, an indication of a cyberattack on the first device based on the first probability and the second probability. The method can further comprise altering, by the cybersecurity system, the first device in response to providing the indication of the cyberattack. Altering the first device comprises modifying functionality of the first device to mitigate the cyberattack.

Further aspects of the present disclosure are directed toward a computer system comprising a processor and a tangible, computer-readable memory for storing program instructions which, when executed by the processor, perform a method comprising collecting respective data from respective devices of a plurality of devices communicatively coupled to one another. Respective data comprises at least one type of data selected from the group consisting of mechanical data and electrical data. The method can further comprise generating, based on the respective data, at least a first feature signature for a first device and predicting, based on the first feature signature, a first future feature signature for the first device. The method can further comprise determining a first probability that the first future feature signature will occur. The first probability can be based on historical data of the first device. The method can further comprise determining a second probability that the first future feature signature will occur. The second probability can be based on historical data of the first device and performance decay data of the first device. The method can further comprise providing, to a user interface, an indication of a cyberattack on the first device based on the first probability and the second probability. The method can further comprise altering the first device in response to providing the indication of the cyberattack. Altering the first device comprises modifying functionality of the first device to mitigate the cyberattack.

Further aspects of the present disclosure are directed toward a computer program product comprising a computer readable storage medium having program instructions embodied therewith. The computer readable storage medium is not a transitory signal per se, and the program instructions are executable by a processor to cause the processor to perform a method. The method comprises collecting respective data from respective devices of a plurality of devices communicatively coupled to one another. Respective data comprises at least one type of data selected from the group consisting of mechanical data and electrical data. The method can further comprise generating, based on the respective data, at least a first feature signature for a first device and predicting, based on the first feature signature, a first future feature signature for the first device. The method can further comprise determining a first probability that the first future feature signature will occur. The first probability can be based on historical data of the first device. The method can further comprise determining a second probability that the first future feature signature will occur. The second probability can be based on historical data of the first device and performance decay data of the first device. The method can further comprise providing, to a user interface, an indication of a cyberattack on the first device based on the first probability and the second probability. The method can further comprise altering the first device in response to providing the indication of the cyberattack. Altering the first device comprises modifying functionality of the first device to mitigate the cyberattack.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
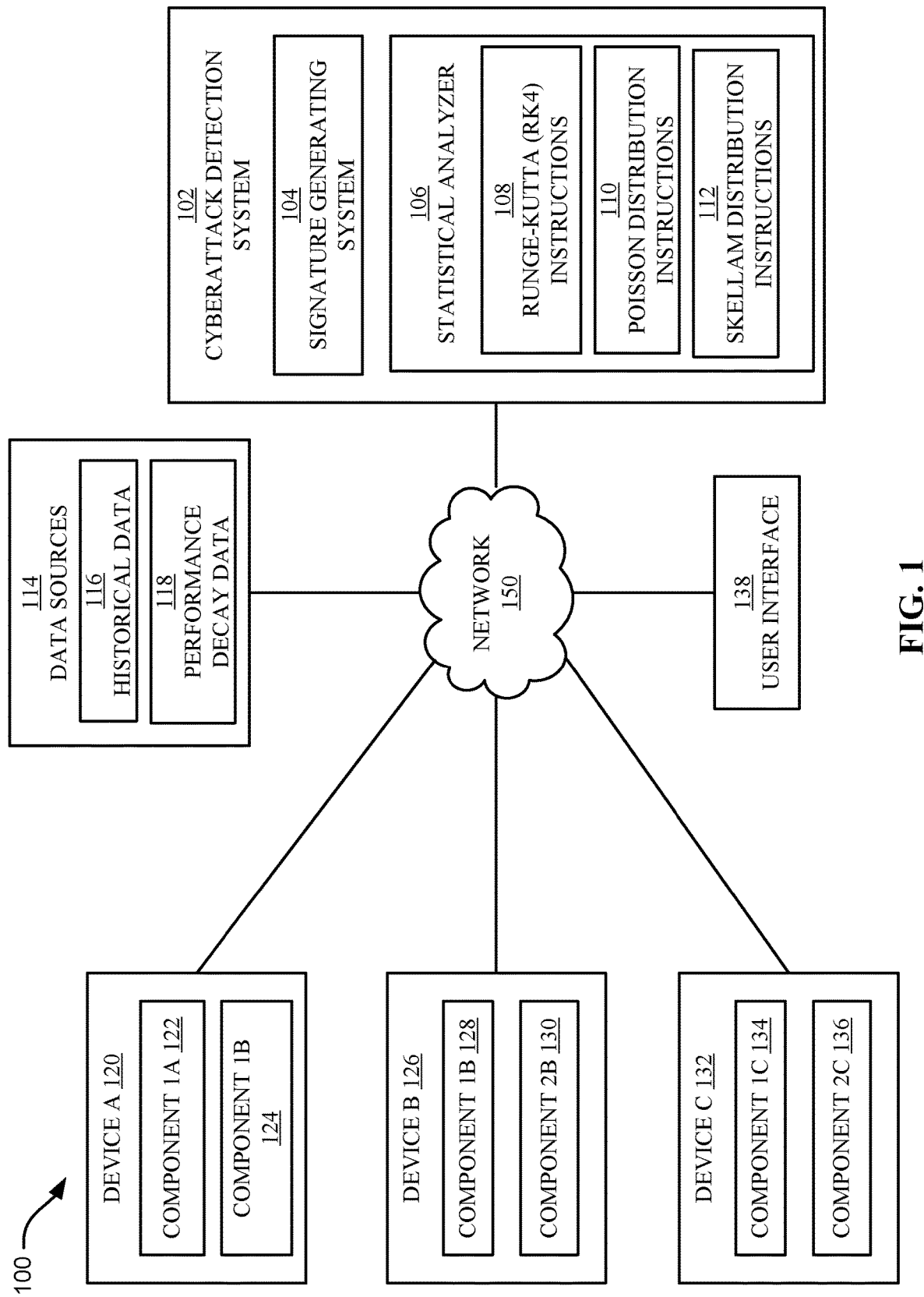
FIG. 1 illustrates a block diagram of an example Internet of Things (IoT) environment in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward detecting malicious attacks, and, more specifically, to detecting malicious attacks using mechanical and/or electrical patterns generated by devices in the Internet of Things (IoT). While the present disclosure is not necessarily limited to such applications, various aspects of the present disclosure may be appreciated through a discussion of various examples using this context.

The IoT can be a network of physical devices generating and sharing data. Physical devices can be, but are not limited to, information processing devices (e.g., computers, laptops, desktops, printers, fax machines, routers, hubs, switches, satellites, etc.), transportation devices (e.g., vehicles, busses, trains, planes, etc.), home devices (e.g., appliances, heating, ventilation, and cooling (HVAC) devices, thermostats, security controls, etc.), consumer devices (e.g., mobile phones, tablets, handheld devices, wearable devices, etc.), manufacturing devices (e.g., computer numerical control (CNC) machines, welding machines, presses, dies, molds, 3D printers, etc.), industrial devices (e.g., turbines, engines, generators, power grids, heat exchangers, etc.), and other devices having electronics, hardware, software, sensors, actuators, and/or network connectivity.

The IoT has applications in many industries such as, but not limited to, manufacturing (e.g., automation, process control, quality control, etc.), utilities (e.g., smart grids, power management, etc.), transportation (e.g., autonomous vehicles, traffic control, etc.), consumer (e.g., smart homes, etc.), defense (e.g., surveillance, security), healthcare (e.g., health monitoring, etc.), and so on.

The IoT is susceptible to malicious attacks (e.g., unauthorized access and/or unauthorized modification of one or more devices in an IoT environment). For example, one type of attack is a torrent attack. A torrent attack simultaneously attacks (e.g., modifies, disrupts, disables, controls, etc.) numerous devices in an IoT environment. Thus, a torrent attack can comprise multiple unauthorized accesses and/or unauthorized modifications to multiple devices in an IoT environment. The multiple unauthorized accesses and/or unauthorized modifications can occur approximately concurrently or within a same interval of time. The multiple unauthorized accesses and/or unauthorized modifications can collectively alter the functionality, performance, security, or utility of the IoT environment. For example, a torrent attack can disable a portion of an IoT environment by reprogramming devices to fail (e.g., by disabling cooling units on devices so that the devices overheat). As another example, a torrent attack can disrupt an IoT environment by flooding devices in the IoT environment with messages and thereby disrupting regular communication.

Aspects of the present disclosure detect and mitigate malicious attacks in an IoT environment by generating respective signatures for respective devices (e.g., using mechanical and/or electrical characteristics), predicting future feature signatures (e.g., using a Runge-Kutta (RK4) method), determining the probability of a predicted future feature signature (e.g., using a Poisson distribution), determining the probability of a predicted future feature signature while accounting for performance decay of the device (e.g., using a Skellam distribution), and/or determining the probability of two or more predicted future feature signals (e.g., using a Skellam distribution).

Torrent attacks in an IoT environment can be difficult to mitigate for numerous reasons. For example, torrent attacks in an IoT environment can be difficult to detect because changes to individual devices may be subtle while consequences for the functioning of the IoT environment can be significant. Aspects of the present disclosure advantageously overcome this advantage by predicting future electrical/mechanical patterns for respective devices based on current rates of change of the electrical/mechanical patterns for respective devices. For example, if a torrent attack attempts to disrupt an IoT environment by incrementally increasing network traffic by 5% every minute, aspects of the present disclosure will predict an overload of network traffic before the IoT environment becomes inundated by network traffic. Thus, aspects of the present disclosure can mitigate an attack before the attack compromises the functionality of the IoT environment.

Torrent attacks in an IoT environment can also be difficult to detect because torrent attacks can be configured to hide modifications made to devices. For example, some cybersecurity applications monitor log data to detect cybersecurity threats. However, a cyberattack that manipulates log data to appear normal may go unnoticed. Aspects of the present disclosure advantageously overcome this challenge by generating feature signatures based on electrical and/or mechanical characteristics of respective devices in the IoT environment. Thus, aspects of the present disclosure are less susceptible to camouflaged cyberattacks.

Aspects of the present disclosure realize numerous advantages. For example, aspects of the present disclosure improve the functioning of devices in an IoT environment by increasing cybersecurity in the IoT environment. For example, aspects of the present disclosure can limit damage (e.g., physical damage, data corruption, data theft, disrupted communication, or other types of damage) in devices in the IoT environment by identifying malicious attacks, and, in some embodiments, mitigating the identified malicious attack (e.g., by issuing a notification, by disconnecting a device from a network, by powering down a device, by purging an instruction set from memory, etc.).

As another example advantage, aspects of the present disclosure identify malicious attacks in the early stages of a malicious attack. Thus, aspects of the present disclosure are proactive (e.g., preventing damage) instead of reactive (e.g., containing damage). Aspects of the present disclosure identify emergent malicious attacks by predicting future feature signatures for devices in an IoT environment. The predicted future feature signatures can be predicted using, for example, a RK4 method. The predicted future feature signature can be based on a rate of change of the electrical and/or mechanical characteristics of a respective device. Since abnormal behavior is identified based on predicted future feature signatures (rather than current feature signatures), malicious attacks can be detected earlier (e.g., before the attack becomes dangerous).

As another example advantage, aspects of the present disclosure reduce false positives associated with malicious attack detection. For example, aspects of the present disclosure account for known performance decay of various devices in the IoT environment. For example, a device nearing the end of its life will have a higher likelihood of exhibiting anomalous behavior than a newly installed device. Aspects of the present disclosure can reduce false positives by using the Skellam distribution to compare a Poisson distribution of a device's performance decay with a Poisson distribution of a device's historical data for a given feature signature.

The aforementioned advantages are example advantages and embodiments exist that contain all, some, or none of the aforementioned advantages while remaining within the spirit and scope of the present disclosure.

Thus, aspects of the present disclosure are necessarily rooted in computer technology at least insofar as aspects of the present disclosure detect cyberattacks (e.g., torrent attacks) in an IoT environment. Aspects of the present disclosure resolve the cybersecurity-centric problem of detecting and mitigating cyberattacks in IoT environments. Aspects of the present disclosure exhibit at least improved detection (e.g., earlier detection of cyberattacks based on predicted future feature signals), improved accuracy (e.g., fewer false positives), and improved computational performance (e.g., a robust and secure IoT environment) relative to known solutions.

Referring now to FIG. 1, illustrated is a block diagram of an example IoT environment 100. IoT environment 100 can include numerous components communicatively coupled by a network 150 such as, but is not limited to a cyberattack detection system 102, data sources 114, numerous devices (e.g., device A 120, device B 126, and device C 132), and a user interface 138.

Cyberattack detection system 102 can include signature generating system 104. Signature generating system 104 can be configured to generate feature signatures for respective devices in IoT environment 100 based on electrical, mechanical, and/or environmental data collected from the respective devices (e.g., device A 120, device B 126, and/or device C 132).

Signature generating system 104 can generate feature signatures based on, for example, velocities (e.g., angular velocity, rotational velocity, linear velocity, etc.), accelerations (e.g., angular acceleration, rotational acceleration, linear acceleration, etc.), movements (e.g., distances, angles, starts/stops, etc.), vibrations, temperatures, power consumption (e.g., amperage, voltage, wattage, resistance, conductivity, etc.), or other factors to generate a respective feature signature for a respective device. In various embodiments, feature signatures can be generated for a respective device based on data collected at an instant in time, or for data collected in a respective time interval (e.g., based on data collected in a 1 second, 5 second, 10 second, 30 second, or a different time interval).

In some embodiments, feature signatures are based on one or more counts of information. That is to say, in some embodiments, feature signatures are in a format conducive to analysis using one or more Poisson distributions (e.g., a probability a certain number of events will occur in a time interval). In some embodiments, respective feature signatures comprise a single number. In some embodiments, respective feature signatures can be in a vector format where respective numbers in the vector correspond to respective types of information collected from a respective device. In some embodiments, respective feature signatures can be in a matrix format where respective rows (or columns) can correspond to multiple pieces of information collected from a component of a device and where respective columns (or rows) correspond to respective components within the device.

In still other embodiments, respective feature signatures can be compiled for sets of devices such that, for example, respective numbers in a respective vector feature signature correspond to respective devices in the set of devices, or, alternatively, where respective sets of numbers (e.g., rows or columns) in a respective matrix feature signature correspond to respective vectors of data collected from respective devices in the set of devices.

Cyberattack detection system 102 can further include a statistical analyzer 106. Statistical analyzer 106 can be configured to identify cyberattacks based on feature signatures generated by signature generating system 104. Statistical analyzer can include Runge-Kutta (RK4) instructions 108. RK4 Instructions 108 can be configured to forecast (e.g., predict, project, anticipate, estimate, extrapolate, etc.) future feature signatures based on a current feature signature and/or historical feature signatures. RK4 instructions 108 are discussed in more detail with respect to FIG. 3. Statistical analyzer 106 can further include Poisson distribution instructions 110. Poisson distribution instructions 110 can be used to determine a probability of the predicted future feature signatures. Poisson distribution instructions 110 are discussed in further detail with respect to FIG. 4. Statistical analyzer 106 can further included Skellam distribution instructions 112. Skellam distribution instructions 112 can be used to compare multiple Poisson distributions to determine a likelihood of a predicted future feature signature for a respective device while accounting for estimated performance decay of the respective device. Skellam distribution instructions 112 are discussed in more detail with respect to FIG. 5.

Cyberattack detection system 102 can collect data from device A 120, device B 126, and device C 132. Device A 120 can include component 1A 122 and component 1B 124. Likewise, device B 126 can include component 1B 128 and component 2B 130. Likewise, device C 132 can include component 1C 134 and component 2C 136. Although device A 120, device B 126, and device C 132 are each shown with two components, each device can contain more or fewer components. Although three devices are shown, embodiments exist containing more or fewer devices (e.g., tens, hundreds, or thousands of devices). Device A 120, device B 126, and device C 132 can be similar or dissimilar IoT devices such as, but not limited to, computers, servers, vehicles, industrial equipment, infrastructure, wearable devices, handheld devices, smartphones, tablets, network components, sensors, and so on. Respective components in respective devices (e.g., components 122, 124, 128, 130, 134, and 136) can be portions of the devices generating the signatures. For example, components can be, but are not limited to, sensors (e.g., temperature sensors, velocity sensors, acceleration sensors, pressure sensors, vibration sensors, movement sensors, global positioning system (GPS) sensors, etc.), memories (e.g., solid state memory, flash memory, volatile memory, non-volatile memory, etc.), processors, network cards, power units, electrical connections and/or cabling, fiber optic connections and/or cabling, displays, actuators, throttles, motors, valves, and so on.

Data sources 114 can include historical data 116 and performance decay data 118. Historical data 116 can include a history of signatures generated by the devices (e.g., device A 120, device B 126, and device C 132). In some embodiments, historical data 116 can be used by Poisson distribution instructions 110 to generate a mean (e.g., average) feature signature for a Poisson distribution in order to determine a likelihood of a predicted future feature signal.

Performance decay data 118 can include data regarding distributions of feature signatures accounting for performance decreases in devices over time (e.g., a sub-optimal (e.g., abnormal, unexpected, rare, poor, etc.) feature signature may have an increasing probability of occurring as equipment ages due to normal wear). In some embodiments, performance decay data 118 can be used by Skellam distribution instructions 112 to determine a mean (e.g., average) feature signature for a device at various points in the life of the device.

User interface 138 can convey information from cyberattack detection system 102 to a user (e.g., an information technology (IT) specialist, a network administrator, etc.). User interface 138 can convey warnings via text, graphs, infographics, sounds, etc. User interface 138 can receive input from a user such as, for example, authorization by the user for the cyberattack detection system 102 to execute a mitigation action.

FIG. 1 is intended to represent the major components of an example IoT environment 100 according to embodiments of the present disclosure. In some embodiments, however, individual components can have greater or lesser complexity than shown in FIG. 1, and components other than, or in addition to those shown in FIG. 1 can be present. Furthermore, in some embodiments, various components illustrated in FIG. 1 can have greater, lesser, or different functionality than shown in FIG. 1.

Figure 2:
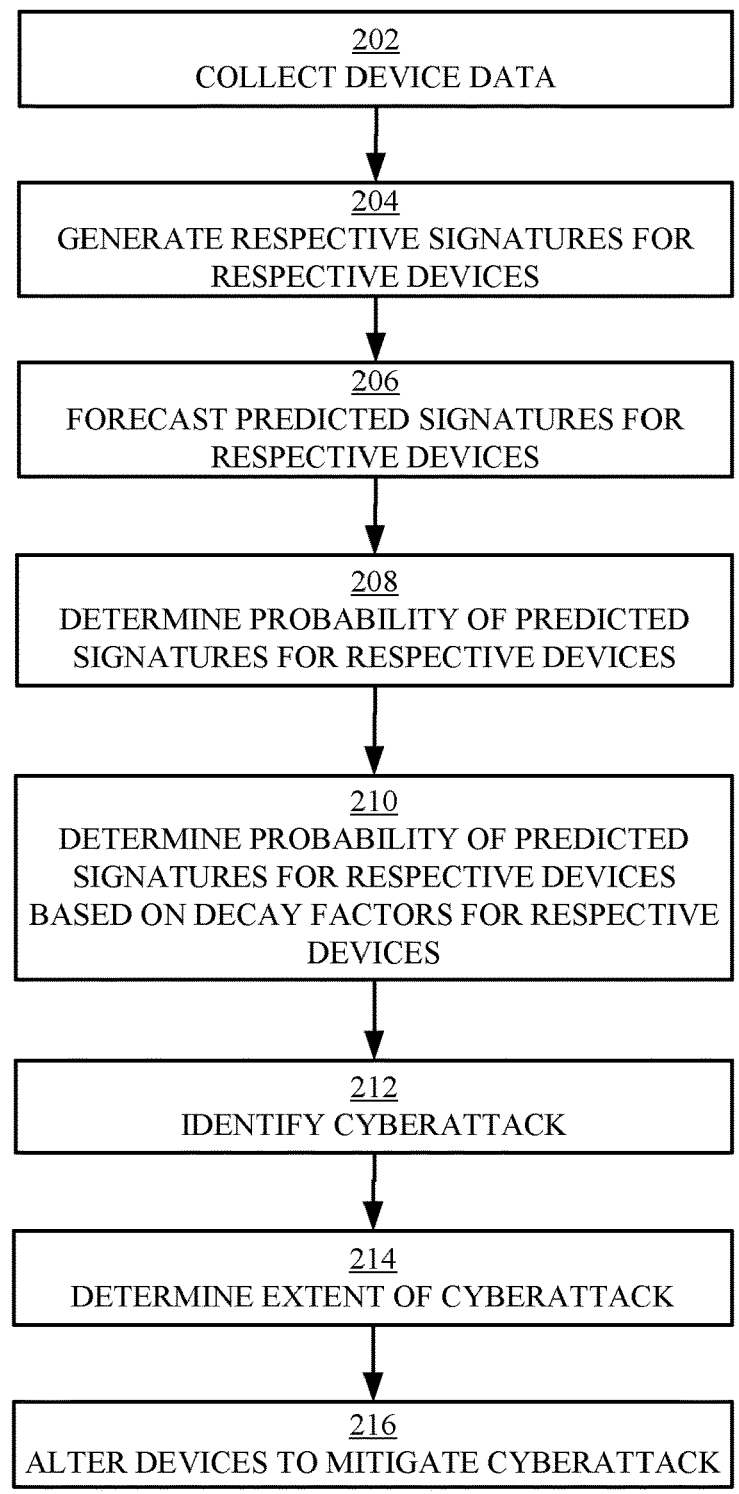
FIG. 2 illustrates a flowchart of an example method for detecting cyberattacks in accordance with some embodiments of the present disclosure.

Referring now to FIG. 2, illustrated is a flowchart of an example method 200 for detecting cyberattacks in accordance with some embodiments of the present disclosure. The method 200 can be performed by, for example, one or more processors, a cyberattack detection system (e.g., cyberattack detection system 102 of FIG. 1), or a different configuration of hardware. For clarity, the method 200 will be described as being performed by cyberattack detection system, however, aspects of the present disclosure can be performed by other hardware components or combinations of hardware components.

In operation 202, the cyberattack detection system can collect device data from a plurality of devices communicatively coupled in a network. In some embodiments, the plurality of devices can comprise an IoT environment (e.g., IoT environment 100 of FIG. 1). Device data can include, but is not limited to, mechanical data (e.g., movement, vibration, velocity, acceleration, temperature, pressure, etc.) and/or electrical data (e.g., amperage, voltage, wattage, resistance, conductivity, etc.). Device data can be collected from one or more components within each device. Device data can be collected for an interval of time (e.g., one second, five seconds, ten seconds, thirty seconds, one minute, one hour, less than any of the aforementioned intervals, greater than any of the aforementioned intervals, etc.).

In operation 204, the cyberattack detection system can generate respective feature signatures for respective devices. Respective feature signatures can be based on the data collected for each respective device in operation 202. In some embodiments, respective feature signatures are generated according to one or more counts of information (also referred to as events) based on the collected device data. For example, a respective feature signature could include a temperature (e.g., degrees Fahrenheit, Celsius, Kelvin, Rankin, etc.) or a change in temperature from a previous measurement. As another example, a respective feature signature could include a number of times a component exhibited a property above a threshold (e.g., angular velocity, voltage draw, etc.). As another example, a respective feature signature could indicate a number of seconds a component exhibited a property above a threshold (e.g., an angular acceleration above a threshold, a temperature above a threshold, etc.). In various embodiments, respective feature signatures comprise a respective number, a respective vector, or a respective matrix.

In operation 206, the cyberattack detection system can forecast future feature signals (e.g., future counts of information) for respective devices based on historical feature signals for the respective devices. In some embodiments, the cyberattack detection system can approximate a solution using methods such as, but not limited to, the Euler method, linear multi-step methods (e.g., Adams-Moulton method, backward differentiation method (BDF), Adams-Bashforth method), Runge-Kutta methods (e.g., RK4), Taylor series, and so on. In some embodiments, the RK4 method is used to generate a respective predicted future feature signal for respective devices. Operation 206 is described in more detail hereinafter with respect to FIG. 3.

In operation 208, the cyberattack detection system can determine a probability of respective predicted future feature signals for respective devices based on a historical average of feature signatures for respective devices. In some embodiments, the cyberattack detection system uses a Poisson distribution to calculate the respective probabilities of predicted future feature signatures. Operation 208 is described in more detail hereinafter with respect to FIG. 4.

In operation 210, the cyberattack detection system can determine a probability of respective predicted future feature signatures occurring for respective devices and accounting for performance decay of the respective devices. In some embodiments, the cyberattack detection system uses the Skellam distribution to determine this probability. Operation 210 is described in more detail hereinafter with respect to FIG. 5.

In operation 212, the cyberattack detection system can identify a cyberattack based on the probabilities determined in operation 208 and/or the probabilities determined in operation 210 (e.g., predicted future feature signals having a probability of occurring below a threshold, thereby indicating anomalous and/or malicious behavior). In some embodiments, the cyberattack detection system determines the probability of two or more predicted future feature signatures occurring simultaneously (e.g., using a Skellam distribution as discussed in more detail hereinafter with respect to FIG. 6).

In some embodiments, the cyberattack detection system can provide a notification (e.g., an indication, a warning, a message, a prompt, etc.) of the detected cyberattack to a user interface (e.g., user interface 138 of FIG. 1). The notification can comprise text, graphics, infographics, sounds, and/or other notifications. In some embodiments, the notification includes a recommended mitigation option to disable the cyberattack and, as part of the notification, requests approval to implement the mitigation action.

In operation 214, the cyberattack detection system can determine an extent of the detected cyberattack. The cyberattack detection system can determine an extent of the detected cyberattack by comparing respective probabilities of respective predicted future feature signatures for respective devices in the network. For example, the extent of the cyberattack can include all devices in the network having a probability of a predicted future feature signature below a threshold. In other embodiments, the cyberattack detection system can use probabilities for differences between respective predicted future feature signatures (e.g., using a Skellam distribution) to identify an extent of a cyberattack. In such embodiments, the boundary of the extent of the cyberattack can be identified by a low probability for respective differences between respective predicted future feature signatures.

In operation 216, the cyberattack detection system can alter (e.g., change, modify, reconfigure, update, etc.) one or more devices in the interconnected network of devices in order to mitigate the cyberattack. For example, the cyberattack detection system can power down a device (e.g., turn off, shut down, restart, enter a low power mode, etc.), disconnect a device (e.g., turn off network functionalities), limit connectivity to a device (e.g., increase permission levels for connectivity to the device, restrict access to the device, etc.), purge a portion of a memory of the device, purge an instruction set from a device, and so on. In some embodiments, operation 216 occurs in response to user input to a user interface (e.g., in response to approval to implement a recommended mitigation in accordance with operation 212).

Although not explicitly described above, some embodiments include combining feature signatures, predicted future feature signatures, and/or probabilities to generate grouped feature signatures and/or probabilities for sets of devices in an IoT environment using methods similar to the methods described above.

FIG. 2 is intended to represent the major operations of an example method for cyberattack detection in accordance with some embodiments of the present disclosure. In some embodiments, however, individual operations can have greater or lesser complexity than shown in FIG. 2, and operations in addition to (or in substitution of) those shown in FIG. 2 can be present. Furthermore, in some embodiments, various operations illustrated in FIG. 2 can have greater, lesser, or different functionality than shown in FIG. 2. Furthermore, in some embodiments, various operations illustrated in FIG. 2 can occur in different orders, if they occur at all.

Figure 3:
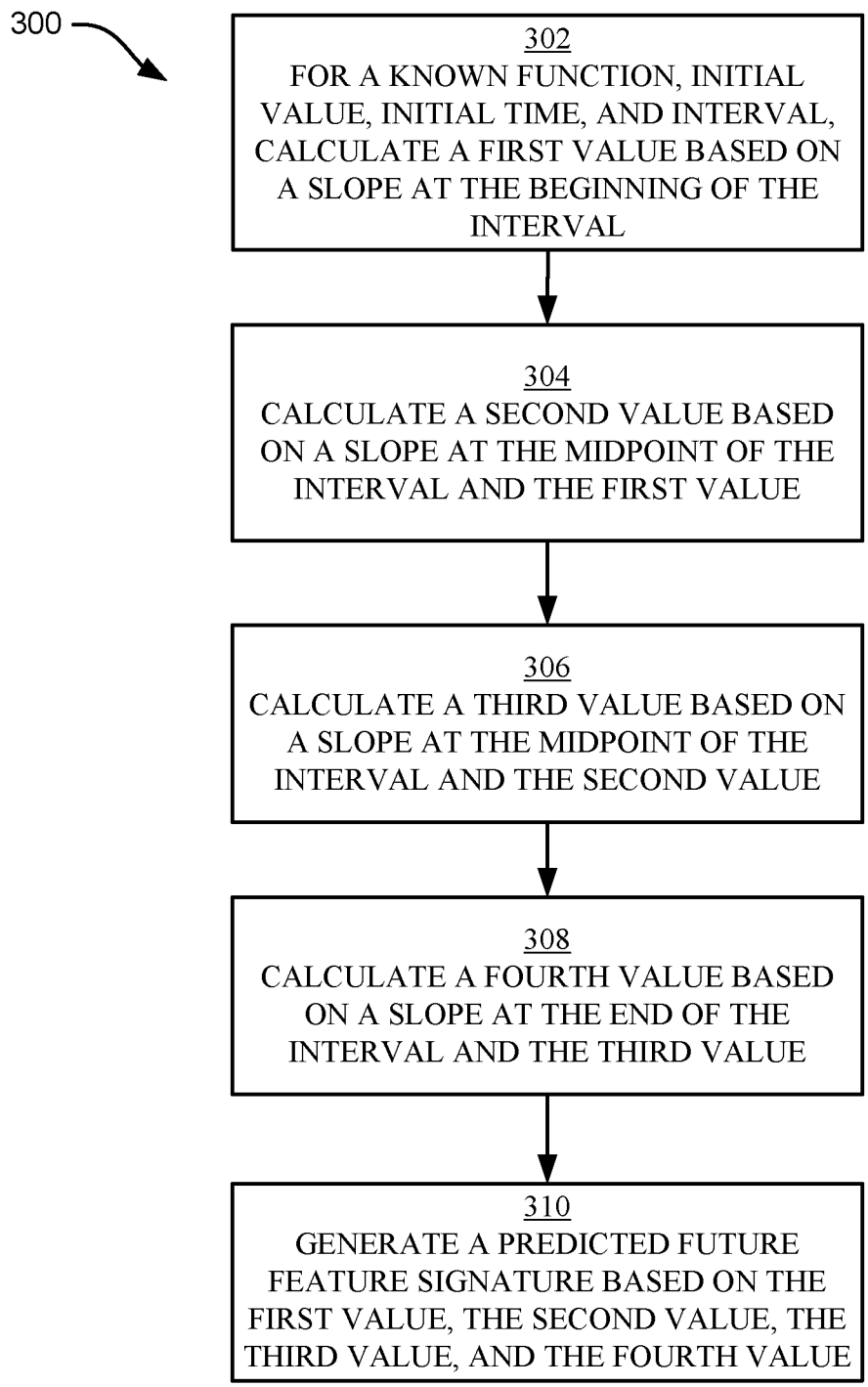
FIG. 3 illustrates a flowchart of an example method for predicting a future feature signature in accordance with some embodiments of the present disclosure.

Referring now to FIG. 3, illustrated is a flowchart of an example method 300 for forecasting (e.g., predicting, projecting, anticipating, estimating, extrapolating) future feature signatures in accordance with some embodiments of the present disclosure. The method 300 can be performed by, for example, one or more processors, a cyberattack detection system (e.g., cyberattack detection system 102 of FIG. 1), or a different configuration of hardware. For clarity, the method 300 will hereinafter be described as being performed by cyberattack detection system, however, aspects of the present disclosure can be performed by other hardware components or combinations of hardware components. In some embodiments, the method 300 is a sub-method of operation 206 of FIG. 2.

In operation 302, the cyberattack detection system begins calculating a first predicted future feature signature for a known feature signature function. In some embodiments, the first predicted future feature signature is based on four values, namely, a first value, a second value, a third value, and a fourth value. In some embodiments, the feature signature function can comprise an ordinary differential equation (ODE). In some embodiments, the feature signature function includes an initial value, an initial time, and a time interval (e.g., h). For example, Equation 1 demonstrates an example feature signature function including an initial value for an initial time and a first interval (e.g., h):

$$y' = f(t,y), \text{ where } y(t_0) = y_0, \text{ and where } t_{n+1} = t_n + h \quad \text{Equation 1}$$

The cyberattack detection system can calculate a first value in operation 302 based on the initial value and a slope at the beginning of the first interval. For example, the first value can be calculated according to Equation 2:

$$k_1 = f(t_n, y_n) \quad \text{Equation 2:}$$

In operation 304, the cybersecurity detection system can calculate a second value based on a slope at the midpoint of the interval using the initial value and the first value. For example, the cybersecurity detection system can calculate the second value according to Equation 3:

$$k_2 = f\left(t_n + \frac{h}{2}, y_n + h\frac{k_1}{2}\right) \quad \text{Equation 3}$$

In operation 306, the cybersecurity detection system can calculate a third value based on a slope at the midpoint of the interval using the initial value and the second value. For example, the cybersecurity detection system can calculate the third value according to Equation 4:

$$k_3 = f\left(t_n + \frac{h}{2}, y_n + h\frac{k_2}{2}\right) \quad \text{Equation 4}$$

In operation 308, the cybersecurity detection system can calculate a fourth value based on a slope at the end (e.g., endpoint) of the interval using the initial value and the third value. For example, the cybersecurity detection system can calculate the fourth value according to Equation 5:

$$k_4 = f(t_n + h, y_n + hk_3) \quad \text{Equation 5:}$$

In operation 310, the cybersecurity detection system can determine a first predicted future feature signature based on the first value, the second value, the third value, and the fourth value. In some embodiments, the first predicted future feature signature is an average (e.g., a weighted average or an unweighted average) of the first value, the second value, the third value, and the fourth value. In some embodiments, the first predicted future feature signature increases the weighting of the second value and the third value relative to the first value and the fourth value. In some embodiments, the second value and the third value are weighted twice as much as the first value and the fourth value. For example, the first predicted future feature signature can be calculated according to Equation 6:

$$y_{n+1} = y_n + \frac{h}{6}(k_1 + 2k_2 + 2k_3 + k_4) \quad \text{Equation 6}$$

Although FIG. 3 is described primarily with respect to feature signatures for one device, in some embodiments the method 300 can be used to forecast feature signatures for numerous devices independently or collectively (e.g., in cases where feature signatures for numerous devices are compiled into a single ordinary differential equation).

FIG. 3 is intended to represent the major operations of an example method for forecasting future feature signatures in accordance with some embodiments of the present disclosure. In some embodiments, however, individual operations can have greater or lesser complexity than shown in FIG. 3, and operations in addition to (or in substitution of) those shown in FIG. 3 can be present. Furthermore, in some embodiments, various operations illustrated in FIG. 3 can have greater, lesser, or different functionality than shown in FIG. 3. Furthermore, in some embodiments, various operations illustrated in FIG. 3 can occur in different orders, if they occur at all.

Figure 4:
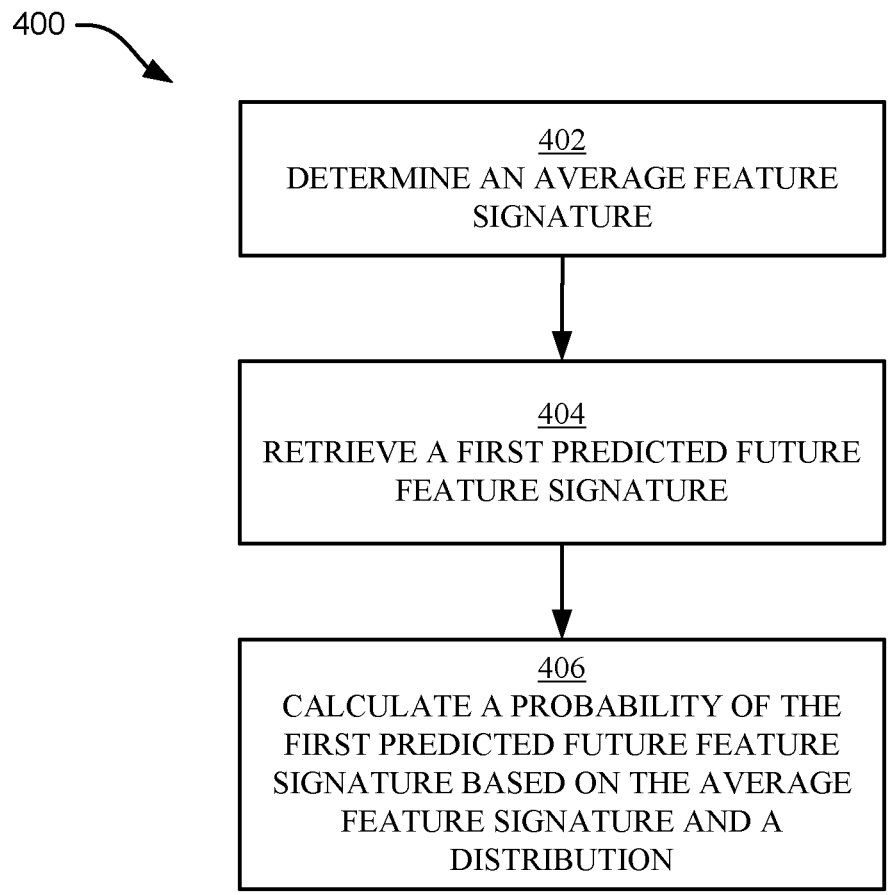
FIG. 4 illustrates a flowchart of an example method for determining a probability of a predicted future feature signature in accordance with some embodiments of the present disclosure.

Referring now to FIG. 4, illustrated is a flowchart of an example method 400 for determining a probability of a predicted future feature signature in accordance with some embodiments of the present disclosure. The method 400 can be performed by, for example, one or more processors, a cyberattack detection system (e.g., cyberattack detection system 102 of FIG. 1), or a different configuration of hardware. For clarity, the method 400 will hereinafter be described as being performed by cyberattack detection system, however, aspects of the present disclosure can be performed by other hardware components or combinations of hardware components. In some embodiments, the method 400 is a sub-method of operation 208 of FIG. 2.

In operation 402, the cyberattack detection system determines an average feature signature (e.g., an average number of events per time interval) for a given device. The average feature signature can be based on historical data collected from the device or from data provided about the device from a manufacturer, supplier, and/or third-party service. In some embodiments, the average feature signature is updated as new historical data is generated by respective devices during operation.

In operation 404, the cyberattack detection system can retrieve a first predicted future feature signature (e.g., a first predicted future number of events). In some embodiments, the first predicted future feature signature is generated according to operation 206 of FIG. 2 and/or the method 300 of FIG. 3.

In operation 406, the cyberattack detection system can calculate a probability of the first predicted future feature signature using the average feature signature and a known distribution. In some embodiments, the cyberattack detection system uses a Poisson distribution. In some embodiments, the cyberattack detection system calculates the probability of the first predicted future feature signature according to Equation 7:

$$P(k) = e - \lambda \frac{\lambda k}{k!} \quad \text{Equation 7}$$

In Equation 7, e can be Euler's number, λ can be the average feature signature retrieved in operation 402, and k can be the predicted future feature signature retrieved in operation 404.

Although the Poisson distribution is discussed above, in alternative embodiments, a normal distribution, a binomial distribution, a Student's t distribution, a Chi-squared distribution, or other distributions and their corresponding statistics can be used.

Although FIG. 4 is described primarily with respect to probabilities of feature signatures for one device, in some embodiments the method 400 can be used to determine probabilities for forecast feature signatures from numerous devices (e.g., in cases where feature signatures and forecast feature signatures are combined for multiple devices).

FIG. 4 is intended to represent the major operations of an example method for determining a probability of a future feature signature in accordance with some embodiments of the present disclosure. In some embodiments, however, individual operations can have greater or lesser complexity than shown in FIG. 4, and operations in addition to (or in substitution of) those shown in FIG. 4 can be present. Furthermore, in some embodiments, various operations illustrated in FIG. 4 can have greater, lesser, or different functionality than shown in FIG. 4. Furthermore, in some embodiments, various operations illustrated in FIG. 4 can occur in different orders, if they occur at all.

Figure 5:
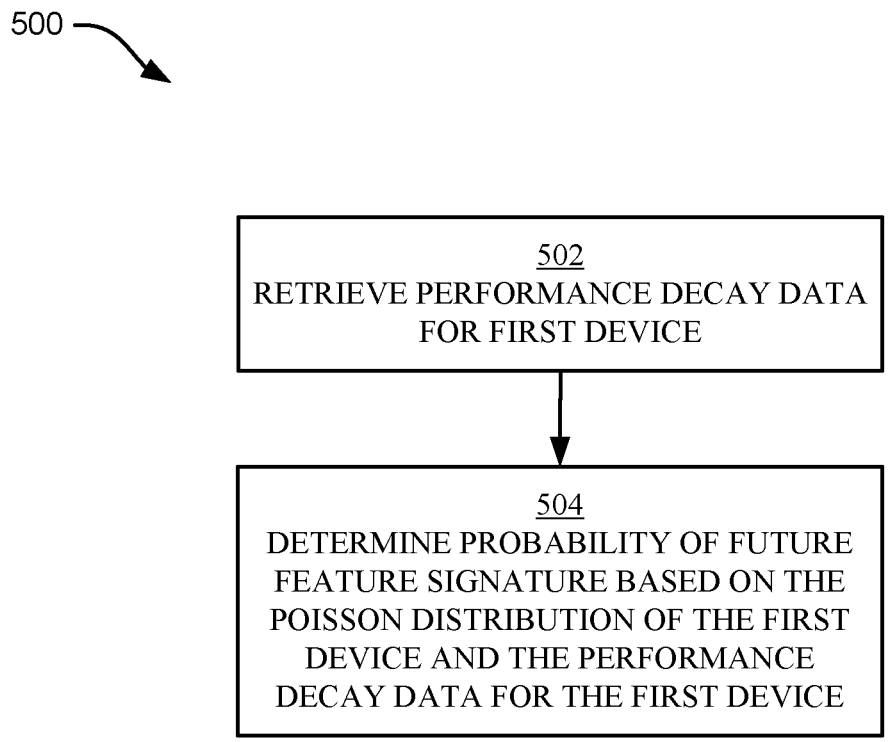
FIG. 5 illustrates a flowchart of an example method for determining a probability of a predicted future feature signature and accounting for performance decay in accordance with some embodiments of the present disclosure.

Referring now to FIG. 5, illustrated is a flowchart of an example method 500 for determining a probability of a forecast feature signature and accounting for device performance decay in accordance with some embodiments of the present disclosure. The method 500 can be performed by, for example, one or more processors, a cyberattack detection system (e.g., cyberattack detection system 102 of FIG. 1), or a different configuration of hardware. For clarity, the method 500 will hereinafter be described as being performed by cyberattack detection system, however, aspects of the present disclosure can be performed by other hardware components or combinations of hardware components. In some embodiments, the method 500 is a sub-method of operation 210 of FIG. 2.

In operation 502, the cyberattack detection system can retrieve performance decay data for a first device (e.g., performance decay data 118 of FIG. 1). In some embodiments, performance decay data can comprise respective Poisson distributions of a feature signature for a type of device at different stages of the anticipated life of the device. The Poisson distributions can include an average feature signature for the first device at different stages in the life of the device. For example, for a first device that is four years old and has an expected lifespan of five years, the performance decay data for the first device at four years may exhibit a less optimal average feature signature than the performance decay data for the first device at two years due to the anticipated increasingly deteriorated condition of the device at four years relative to two years.

In operation 504, the cyberattack detection system can determine a probability of a predicted future feature signature based on the performance decay data for the device. In some embodiments, the cyberattack detection system can compare the Poisson distribution of the first device (e.g., discussed with respect to FIG. 4) with the Poisson distribution of the performance decay data. In some embodiments, operation 504 comprises convoluting the two Poisson distributions. In some embodiments, operation 504 comprises combining the Poisson distributions according to the Skellam distribution as described with respect to Equation 8:

$$P(k, \mu_1, \mu_2) = e^{-(\mu_1+\mu_2)} \left(\frac{\mu_1}{\mu_2}\right)^{\frac{k}{2}} I_k(2\sqrt{\mu_1\mu_2}) \quad \text{Equation 8}$$

In Equation 8, k can represent the difference between Poisson distributed variables (e.g., the difference in probability of the predicted future feature signature based on the historical data and the performance decay data), $\mu_1$ can represent the average feature signature for the historical data, $\mu_2$ can represent the average feature signature for the performance decay data, and $I_k$ can represent a modified Bessel function of the first kind.

Thus, the method 500 can reduce false positives by providing a check that a predicted feature signature having a low probability of occurring (e.g., potentially indicating a cyberattack) according to historical data for the device may nonetheless be considered normal (e.g., indicating expected behavior) when accounting for expected degradation in equipment performance.

Although FIG. 5 is described primarily with respect to probabilities accounting for performance decay for one device, in some embodiments the method 500 can be used to determine probabilities accounting for performance decay from numerous devices (e.g., in cases where feature signatures and forecast feature signatures are combined for multiple devices and where performance decay is generated for the combined multiple devices).

FIG. 5 is intended to represent the major operations of an example method for determining a probability of a future feature signature in accordance with some embodiments of the present disclosure. In some embodiments, however, individual operations can have greater or lesser complexity than shown in FIG. 5, and operations in addition to (or in substitution of) those shown in FIG. 5 can be present. Furthermore, in some embodiments, various operations illustrated in FIG. 5 can have greater, lesser, or different functionality than shown in FIG. 5. Furthermore, in some embodiments, various operations illustrated in FIG. 5 can occur in different orders, if they occur at all.

Figure 6:
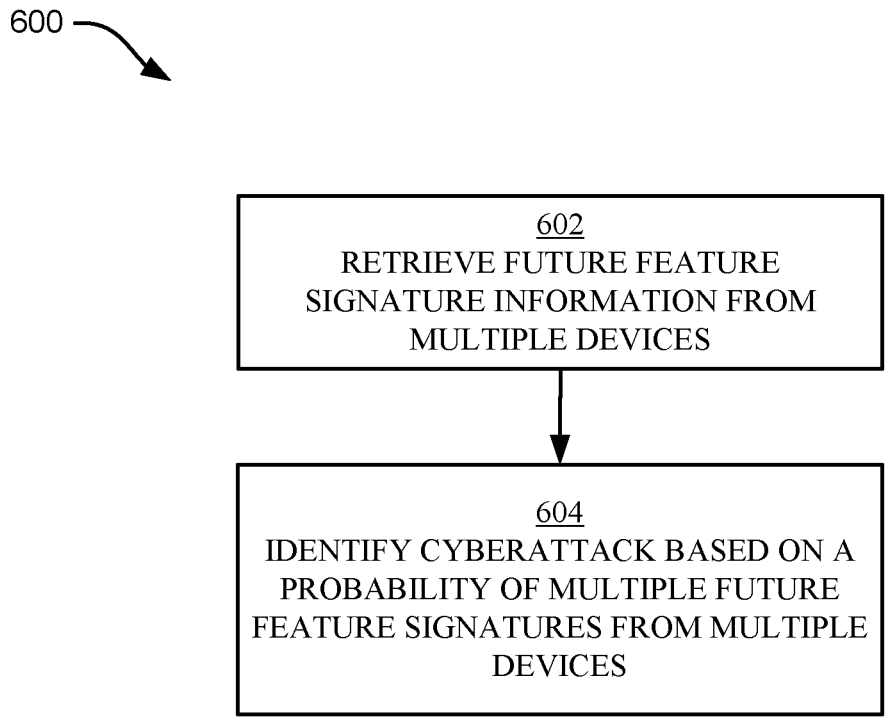
FIG. 6 illustrates a flowchart of an example method for determining a probability of a cyberattack based on a difference between two or more predicted future feature signatures in accordance with some embodiments of the present disclosure.

Referring now to FIG. 6, illustrated is a flowchart of an example method 600 for determining a probability of a cyberattack based on a difference between two or more predicted future feature signatures in accordance with some embodiments of the present disclosure. The method 600 can be performed by, for example, one or more processors, a cyberattack detection system (e.g., cyberattack detection system 102 of FIG. 1), or a different configuration of hardware. For clarity, the method 600 will hereinafter be described as being performed by cyberattack detection system, however, aspects of the present disclosure can be performed by other hardware components or combinations of hardware components. In some embodiments, the method 600 is a sub-method of operation 212 of FIG. 2.

In operation 602, the cyberattack detection system can retrieve predicted future feature signature information from multiple devices. In some embodiments, the predicted future feature signature information is based on information generated in, for example, operation 206-210 of FIG. 2, the method 300 of FIG. 3, and/or the method 400 of FIG. 4. In some embodiments, the cyberattack detection system retrieves predicted future feature signatures and average feature signatures from multiple devices.

In operation 604, the cyberattack detection system can determine a probability of a cyberattack based on a difference between the two or more predicted future feature signatures. The probability of the difference between the two or more predicted future feature signatures occurring can be based on at least a first predicted future feature signature for a first device, a first average feature signature for the first device, a second predicted future feature signature for a second device, and a second average feature signature for the second device.

In some embodiments, the cyberattack detection system uses a Skellam distribution (previously discussed with respect to Equation 8) to determine a probability of the difference between two or more predicted future feature signatures. The Skellam distribution (e.g., Equation 8) can indicate the probability of a difference between two feature signatures based on an expected difference according to average feature signatures for each of the two or more devices. Thus, two devices having similar average feature signatures have a higher probability of having a small difference between two or more measured feature signatures compared to a large difference. Likewise, two devices having dissimilar average feature signatures have a higher probability of having a difference between two or more measured feature signatures similar to the degree of dissimilarity between the average feature signatures compared to having little or no difference. Thus, as used in FIG. 6, the Skellam distribution can be effective in determining if a concerted effort to simultaneously modify multiple devices is occurring (e.g., a torrent cyberattack).

For example, a high probability can indicate either that multiple devices are behaving normally, or that multiple devices are simultaneously being modified in a similar manner. In contrast, a low probability can indicate abnormal behavior in one of two or more devices (e.g., failure due to age). Thus, aspects of FIG. 6, taken together with the probabilities determined in operations 208-210 of FIG. 2, can be useful in identifying torrent cyberattacks. That is to say, predicted future feature signatures having individual low probabilities of occurring (possibly indicating abnormal behavior), taken together with a difference between two or more predicted future feature signatures of two or more devices having a high probability (possibly indicating a multi-device attack), can be useful in identifying torrent cyberattacks (and reducing false positives).

In such embodiments, a cyberattack can be identified based on the probability of two or more feature signatures occurring relative to a threshold. In one example, where probabilities for individual predicted future feature signatures of the two or more devices are below a first threshold (indicating abnormal behavior), and where the probability of the difference between the two or more predicted future feature signatures are above another threshold (e.g., indicating a pattern of abnormal behavior, such as a torrent cyberattack), the cyberattack detection system can identify a torrent cyberattack.

FIG. 6 is intended to represent the major operations of an example method for determining a probability of two or more feature signatures occurring in accordance with some embodiments of the present disclosure. In some embodiments, however, individual operations can have greater or lesser complexity than shown in FIG. 6, and operations in addition to (or in substitution of) those shown in FIG. 6 can be present. Furthermore, in some embodiments, various operations illustrated in FIG. 6 can have greater, lesser, or different functionality than shown in FIG. 6. Furthermore, in some embodiments, various operations illustrated in FIG. 5 can occur in different orders, if they occur at all.

Figure 7:
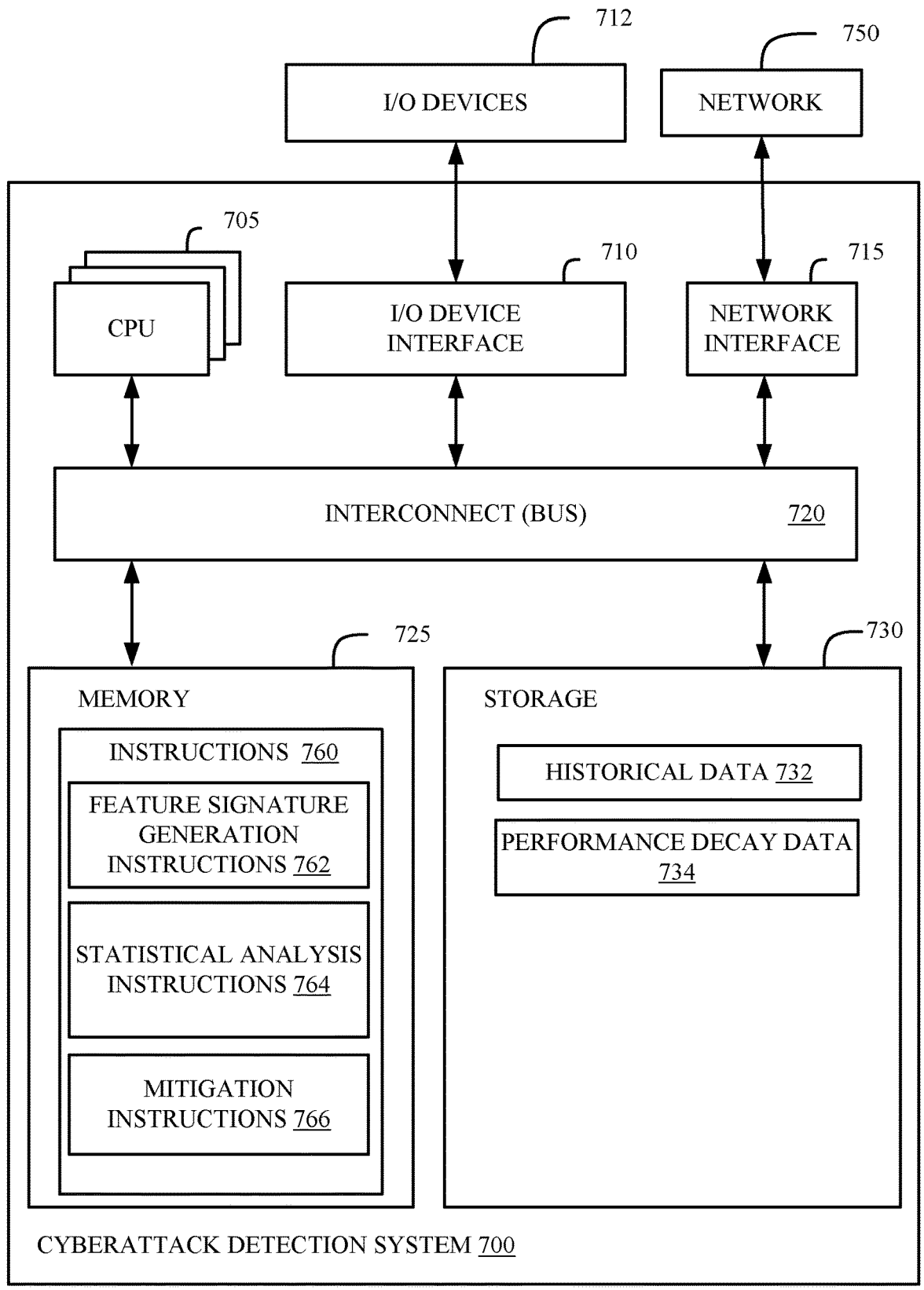
FIG. 7 illustrates a block diagram of an example cyberattack detection system in accordance with some embodiments of the present disclosure.

FIG. 7 illustrates a block diagram of a cyberattack detection system 700 in accordance with some embodiments of the present disclosure. In some embodiments, cyberattack detection system 700 is consistent with cyberattack detection system 102 of FIG. 1. In various embodiments, cyberattack detection system 700 performs any of the methods described in FIGS. 2-6. In some embodiments, cyberattack detection system 700 provides instructions for one or more of the methods described in FIGS. 2-6 to a client machine such that the client machine executes the method, or a portion of the method, based on the instructions provided by the cyberattack detection system 700.

The cyberattack detection system 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random access memory (e.g., static random access memory (SRAM), dynamic random access memory (DRAM), or Flash). The storage 730 is generally included to be representative of a non-volatile memory, such as a hard disk drive, solid state device (SSD), removable memory cards, optical storage, or flash memory devices. In an alternative embodiment, the storage 730 can be replaced by storage area-network (SAN) devices, the cloud, or other devices connected to the anomaly detection system 700 via the I/O devices interface 710 or a network 750 via the network interface 715.

In some embodiments, the memory 725 stores instructions 760 and the storage 730 stores historical data 732 and performance decay data 734. However, in various embodiments, the instructions 760, the historical data 732, and the performance decay data 734 are stored partially in memory 725 and partially in storage 730, or they are stored entirely in memory 725 or entirely in storage 730, or they are accessed over a network 750 via the network interface 715.

Historical data 732 can be consistent with historical data 116 of FIG. 1. Historical data 732 can store, for example, a database recording respective historical averages for feature signatures of respective devices.

Performance decay data 734 can be consistent with performance decay data 118 of FIG. 1. Performance decay data 734 can store respective average feature signatures for respective devices based on an age or use (e.g., a number of months in operation, a number of logged hours of use, etc.). Thus, performance decay data 734 can be used to reduce false positives by evaluating if an abnormal feature signature may be due to expected deterioration of equipment through age and/or use.

The instructions 760 are processor executable instructions including feature signature generation instructions 762, statistical analysis instructions 764, and mitigation instructions 766. Feature signature generation instructions 762 can be executed by cyberattack detection system 700 to collect data from numerous devices in an IoT environment and generate a feature signature for each respective device based on the collected data. Feature signature generation instructions 762 can be configured to perform, for example, operations 202 and 204 of FIG. 2. In some embodiments, feature signature generations instructions 762 are consistent with signature generating system 104 of FIG. 1.

Statistical analysis instructions 764 can be executed by cyberattack detection system 700 to statistically evaluate the feature signatures. Statistical analysis instructions 764 can be configured to predict future feature signatures, determine probabilities of future feature signatures, and determine probabilities for future feature signatures while accounting for performance decay. Statistical analysis instructions 764 can be configured to perform portions of operations 206-210 of FIG. 2 and FIGS. 3-5. In some embodiments, statistical analysis instructions 764 are consistent with statistical analyzer 106 of FIG. 1.

Mitigation instructions 766 can be executed by cyberattack detection system 700 to mitigate (e.g., stop, limit, disrupt, terminate, contain, neutralize) a cyberattack and/or to protect (e.g., preserve, backup, isolate) data, hardware, software, or other targets of a cyberattack. Mitigation instructions 766 can physically alter an IoT environment (e.g., by powering down devices) and/or functionally alter the IoT environment (e.g., by modifying connectivity permission conditions) and/or electronically alter the IoT environment (e.g., by purging instruction sets from memory) in order to mitigate a detected cyberattack. Mitigation instructions 766 can perform portions of operations 212-216 of FIG. 2.

In various embodiments, the I/O devices 712 include an interface capable of presenting information and receiving input (e.g., user interface 138 of FIG. 1). For example, I/O devices 712 can present information to a user (e.g., a cyberattack warning) interacting with cyberattack detection system 700 and receive input from a user (e.g., a selected mitigation action).

Cyberattack detection system 700 is connected to the network 750 via the network interface 715. In some embodiments, network 750 is consistent with network 150 of FIG. 1.

FIG. 7 is intended to represent the major components of an example cyberattack detection system 700 according to embodiments of the present disclosure. In some embodiments, however, individual components can have greater or lesser complexity than shown in FIG. 7, and components other than, or in addition to those shown in FIG. 7 can be present. Furthermore, in some embodiments, various components illustrated in FIG. 7 can have greater, lesser, or different functionality than shown in FIG. 7.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
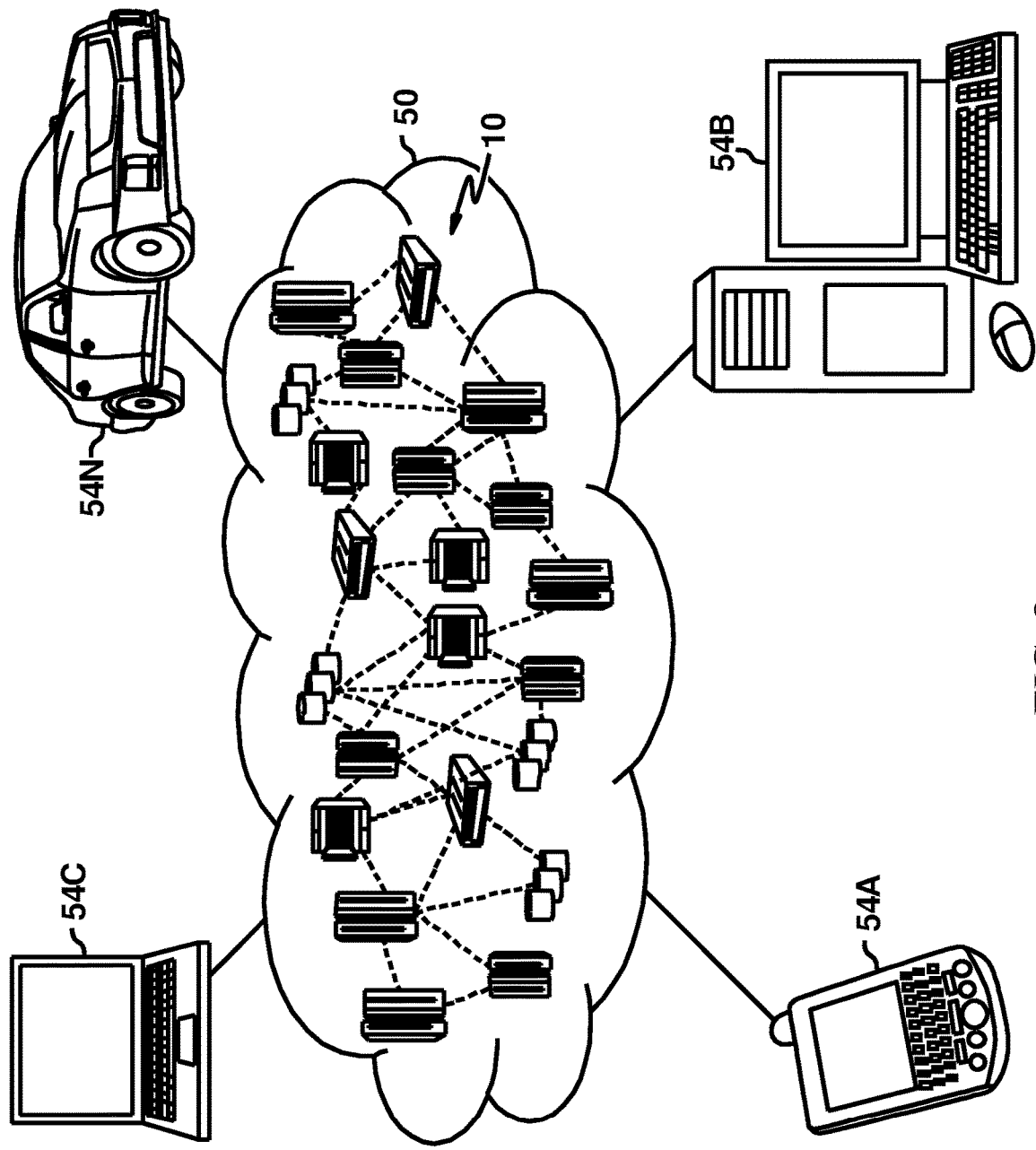
FIG. 8 depicts a cloud computing environment according to some embodiments of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
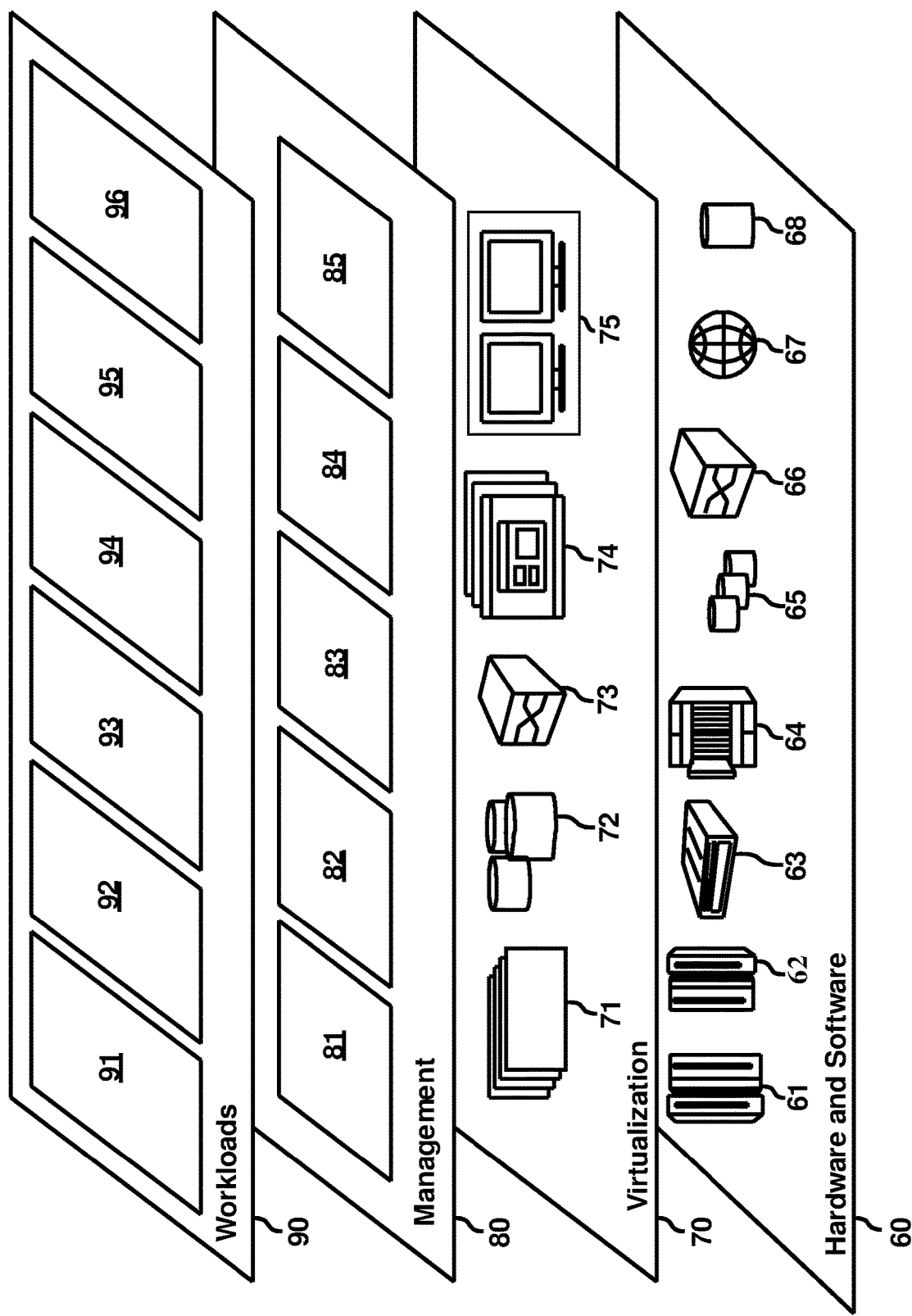
FIG. 9 depicts abstraction model layers according to some embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cyberattack detection 96.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 760 of FIG. 7 and/or any software configured to perform any subset of the methods described with respect to FIGS. 2-6) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

What is claimed is:

1. A computer-implemented method comprising:
   collecting, by a cybersecurity system, respective data from respective devices of a plurality of devices communicatively coupled to one another, wherein respective data comprises at least one type of data selected from the group consisting of mechanical data and electrical data;
   generating, by the cybersecurity system and based on the respective data, at least a first feature signature for a first device of the plurality of devices;
   predicting, by the cybersecurity system and based on the at least first feature signature, a first future feature signature for the first device;
   determining, by the cybersecurity system, a first probability that the first future feature signature will occur, wherein the first probability is based on historical data of the first device;
   determining, by the cybersecurity system, a second probability that the first future feature signature will occur, wherein the second probability is based on historical data of the first device and performance decay data of the first device;
   providing, by the cybersecurity system and to a user interface, an indication of a cyberattack on the first device based on the first probability and the second probability; and
   altering, by the cybersecurity system, the first device in response to providing the indication of the cyberattack, wherein altering the first device comprises modifying functionality of the first device to mitigate the cyberattack.

2. The method according to claim 1, wherein the respective data comprises mechanical data, wherein the mechanical data is selected from the group consisting of: vibration, velocity, acceleration, and temperature.

3. The method according to claim 1, wherein the respective data comprises electrical data, wherein the electrical data is selected from the group consisting of: amperage, voltage, and wattage.

4. The method according to claim 1, wherein predicting a first future feature signature further comprises:
   calculating the first future feature signature after an interval of time from the feature signature, wherein calculating the first future feature signature comprises an average of a first value, a second value, a third value, and a fourth value, wherein the second value and the third value are weighted by a factor of two compared to the first value and the fourth value, wherein the calculating the first future feature signature further comprises:
   calculating the first value based on a slope at a beginning of the interval;
   calculating the second value based on a midpoint of the interval and the first value;
   calculating the third value based on a midpoint of the interval and the second value; and
   calculating the fourth value based on an endpoint of the interval and the third value.

5. The method according to claim 1, wherein determining the first probability further comprises:
   determining an average feature signature for the first device based on historical data for the first device, wherein the average feature signature comprises an average number of events; and
   calculating the first probability using the average feature signature, the first future feature signature, and a Poisson distribution based on the historical data for the first device, wherein the first future feature signature comprises a first future number of events.

6. The method according to claim 1, wherein the first probability is based on a first Poisson distribution of feature signatures for the first device, wherein the first Poisson distribution is based on historical data of the first device, wherein determining the second probability further comprises:
   retrieving performance decay data for the first device, wherein the performance decay data comprises a second Poisson distribution of feature signatures for the first device for an age of the first device; and
   determining the second probability based on convoluting the first Poisson distribution and the second Poisson distribution.

7. The method according to claim 1, wherein predicting the first future feature signature comprises predicting the first future feature signature based on a Runge-Kutta (RK4) method.

8. The method according to claim 7, wherein determining the first probability further comprises using a first Poisson distribution based on historical data of the first device.

9. The method according to claim 8, wherein determining the second probability further comprises using a Skellam distribution to determine the second probability, wherein the Skellam distribution is based on the first Poisson distribution and a second Poisson distribution based on performance decay data of the first device.

10. The method according to claim 1, wherein altering the first device further comprises:
    powering down the first device.

11. The method according to claim 1, wherein altering the first device further comprises:
    disconnecting the first device from the plurality of devices.

12. The method according to claim 1, wherein altering the first device further comprises:
    restricting access to the first device.

13. The method according to claim 1, wherein altering the first device further comprises:
    purging at least a portion of memory in the first device.

14. The method according to claim 1, further comprising:
determining, by the cybersecurity system, an extent of the cyberattack by determining at least respective first probabilities for respective devices of the plurality of devices, wherein the extent of the cyberattack comprises devices having a first probability below a first threshold.

15. The method according to claim 1, wherein the plurality of devices comprise an Internet of Things (IoT) environment, and wherein the cyberattack comprises a torrent cyberattack effecting at least a portion the plurality of devices.

16. The method according to claim 15, wherein the torrent cyberattack comprises approximately simultaneous unauthorized respective modifications to respective devices of the plurality of devices in the IoT environment, wherein the respective modifications alter performance of respective devices.

17. The method according to claim 1, further comprising:
determining, in response to the second probability being below a first threshold, a third probability based on the first future feature signature and a second future feature signature, wherein the second future feature signature is associated with a second device of the plurality of devices; and
identifying a torrent cyberattack based on the third probability being above a second threshold.

18. The method according to claim 17, wherein the third probability represents a probability of a difference between the first future feature signature and the second future feature signature based on a first average feature signature for the first device and a second average feature signature for the second device.

19. A computer system comprising:
a processor;
a tangible, computer-readable storage medium having program instructions embodied therewith, wherein the tangible, computer-readable storage medium is not a transitory signal per se, and wherein the program instructions, when executed by the processor, are configured to cause the processor to perform a method comprising:
collecting respective data from respective devices of a plurality of devices communicatively coupled to one another, wherein respective data comprises at least one of data selected from the group consisting of mechanical data and electrical data;
generating, based on the respective data, at least a first feature signature for a first device of the plurality of devices;
predicting, based on the at least first feature signature, a first future feature signature for the first device;
determining a first probability that the first future feature signature will occur, wherein the first probability is based on historical data of the first device;
determining a second probability that the first future feature signature will occur, wherein the second probability is based on historical data of the first device and performance decay data of the first device;
providing, to a user interface, an indication of a cyberattack on the first device based on the first probability and the second probability; and
altering the first device in response to providing the indication of the cyberattack, wherein altering the first device comprises modifying functionality of the first device to mitigate the cyberattack.

20. A computer program product comprising a computer readable storage medium having program instructions embodied therewith, wherein the computer readable storage medium is not a transitory signal per se, the program instructions executable by a processor to cause the processor to perform a method comprising: collecting respective data from respective devices of a plurality of devices communicatively coupled to one another, wherein respective data comprises at least one type of data selected from the group consisting of mechanical data and electrical data;
generating, based on the respective data, at least a first feature signature for a first device of the plurality of devices;
predicting, based on the at least first feature signature, a first future feature signature for the first device;
determining a first probability that the first future feature signature will occur, wherein the first probability is based on historical data of the first device;
determining a second probability that the first future feature signature will occur, wherein the second probability is based on historical data of the first device and performance decay data of the first device;
providing, to a user interface, an indication of a cyberattack on the first device based on the first probability and the second probability; and
altering the first device in response to providing the indication of the cyberattack, wherein altering the first device comprises modifying functionality of the first device to mitigate the cyberattack.

* * * * *